United States Patent [19]

Ash et al.

[11] 3,941,895

[45] Mar. 2, 1976

[54] REPLACEMENT OF NONFAT DRY MILK

[75] Inventors: David J. Ash, Norwalk; John C. Colmey, Stamford, both of Conn.

[73] Assignee: International Telephone and Telegraph Corporation, Nutley, N.J.

[22] Filed: Nov. 29, 1973

[21] Appl. No.: 420,036

[52] U.S. Cl. ............... 426/549; 426/62; 426/553; 426/556; 426/558; 426/583
[51] Int. Cl.² ........................................ A21D 13/00
[58] Field of Search ........... 426/152, 185, 187, 215, 426/343, 345, 356, 359, 364, 62, 155, 157, 159, 189

[56] References Cited
UNITED STATES PATENTS

| | | | |
|---|---|---|---|
| 828,251 | 8/1906 | Solliday | 426/185 |
| 3,061,442 | 10/1962 | Ward et al. | 426/186 |
| 3,547,900 | 12/1970 | Dienst et al. | 426/425 X |

*Primary Examiner*—A. Louis Monacell
*Assistant Examiner*—R. A. Yoncoskie
*Attorney, Agent, or Firm*—John T. O'Halloran; Menotti J. Lombardi, Jr.

[57] ABSTRACT

A selected demineralized and partially delactosed whey is used as a substitute for nonfat dry milk in various food compositions. The selected whey has a predetermined ash to protein ratio of 0.01 to 0.3. Also, the selected whey can be combined with a modified starch to provide a satisfactory replacement for the nonfat dry milk constituent in baked goods.

4 Claims, No Drawings

REPLACEMENT OF NONFAT DRY MILK

BACKGROUND OF THE INVENTION

This invention is related to whey and whey blends for use as an ingredient in bakery products and the like.

Whey products have been proposed as low cost substitutes for nonfat dry milk (NFDM) for various bakery products, especially since the price of NFDM continues to increase. However, when whey is substituted for NFDM many baked products suffer in the exchange. For example, when substituting for NFDM in cake batters, the resultant batter produces cakes with low volume, poor overall quality scores, and poor keeping properties. The whey batter would also have a lower absorption requirement than the NFDM thus reducing the overall batter yield. These and other problems must be addressed so that the correct whey and whey blend can be selected for use in bakery related products.

SUMMARY OF THE INVENTION

An object of the invention is the provision of a selected whey constituent for use in food compositions.

Another object of the invention is to provide a whey blend constituent for use in baked goods and the like.

A further object of the invention is to provide a selected whey and a whey blend for use as a constituent in cake and bread compositions and the like which may be used as a substitute for NFDM.

Accordingly, a selected partially demineralized and partially delactosed whey has been found to be a satisfactory replacement for NFDM. Also, a blend of partially demineralized and partially delactosed whey plus a modified starch has been used and found effective as a replacement for NFDM.

DESCRIPTION OF THE PREFERRED EMBODIMENTS

The term "whey" ordinarily means the liquid remaining after the removal of the casein and fat from milk. Whey can be made from skim milk, whole milk or buttermilk. Normally, whole liquid whey is the liquid obtained from the process of making cheese. Although the composition of the whole liquid whey may vary somewhat according to the particular cheese making process, an approximate composition of whole liquid whey, percent by weight, is: Water - 93.2%; Protein - 0.9%; Lactose - 5.1%; Fat - 0.3%; and Minerals - 0.5%.

The liquid contains therefore approximately 7% by weight solids, which are obtained by one of several known processes to remove water, or some or all of the non-protein constituents. An approximate regular dry whey solid has a composition in percent by weight of: Protein - 12.5%; Fat - 1%; Moisture - 4.5%; Ash - 9%; and Lactose - 73%.

An important feature of the invention is the composition of a selected partially demineralized and partially delactosed whey solid comprising the following ingredients and proportions:

| Ingredients Whey Solids | Percent by Weight Range | Preferred |
|---|---|---|
| Lactose | 20–60 | 32 |
| Protein | 25–80 | 54 |
| Ash | 1–12 | 10 |
| Moisture | 2–6 | 4 |
| Fat | 0–2 | trace |
| Ash/Protein | 0.01–0.3 | 0.2 |

Such a selected whey composition is identified as: Enrpro 50 (Stauffer Chemical Co., Edina, MN.) or Foretein 35 (Foremost Food Co., San Francisco, CA.).

Another important feature of the invention is the composition of a blend of the selected partially demineralized and partially delactosed whey combined with a modified starch such as National 711 (National Starch and Chemical Corp., N.Y., N.Y.) or Instant 721A (American Maize Products Co., N.Y., N.Y.), having the following approximate impurity ingredients and proportions:

| Modified Starch | Approximate Percent by Weight Range | Preferred |
|---|---|---|
| Protein | 0–0.3 | 0.15 |
| Fat | 0–0.5 | 0.25 |
| Fibre | 0–0.2 | 0.10 |
| Ash | 0.1–0.7 | 0.3 |
| Moisture | 5–12 | 6.0 |

EXAMPLE I

As an example of the practice of the invention, four different cake lots (18 items per lot) were made, lot I-A used NFDM, lot I-B used regular whey, lot I-C used the selected partially demineralized and partially delactosed whey, and lot I-D used the blend of the partially demineralized and partially delactosed whey combined with the modified starch. The cake constituents comprised the following:

| Ingredients | Approximate Percent by Weight (Preferred) | | | |
|---|---|---|---|---|
| | I-A | I-B | I-C | I-D |
| Flour | 29.00 | 29.0 | 29.0 | 30.10 |
| Sugar | 29.00 | 29.0 | 30.00 | 30.0 |
| Water | 18.00 | 18.0 | 18.0 | 18.0 |
| Eggs | 18.0 | 18.0 | 18.0 | 18.0 |
| Leavening | 1.50 | 1.5 | 1.5 | 1.5 |
| Salt | .80 | .8 | .8 | .8 |
| Emulsifier | .50 | .5 | .5 | .5 |
| Flavor | .20 | .2 | .2 | .2 |
| | Range/ Preferred | Range/ Preferred | Range/ Preferred | Range/ Preferred |
| NFDM | 0–5.0/3.0 | | | |
| Regular Whey Solids | | 0.75–9.0/3.0 | | |
| Selected Whey Solids | | | 0.4–3.0/2.00 | 0.4–3.0/0.75 |
| Modified Starch | | | | 0–1.0/0.15 |

PROCEDURE:

The cakes were prepared according to the following procedure. Adjustments were made by procedures familiar to those skilled in the art in the amounts of sugar and flour in percent by weight to compensate for those cases where there is a difference between the amounts of NFDM, regular whey, selected whey, and whey blend added.

Combine and blend all dry ingredients except the leavening, add eggs and one third of the water, and mix for three minutes at high (third) speed on a C100 Hobart Mixer (Hobart Manufacturing Co., Troy, Ohio) with a cake wire whip. Add the remaining water and leavening and mix two minutes at low (first) speed. Bake in an appropriate snack cake pan for 12 minutes at 400°F.

The procedure was repeated for all four lots in the indicated ranges and according to standard techniques.

RESULTS:

Cakes were evaluated at 24 hours and five days after baking for volume, quality and keeping quality. The selected whey and whey blend cakes were equal to the NFDM in volume and quality at 24 hours. The selected whey cakes exhibited better keeping properties than the NFDM cakes at five day evaluation. Regular whey cakes were lower in volume, and poorer in quality and keeping properites than the other cakes at the 24 hour and five day evaluation.

EXAMPLE II

As a second applicable example in contrast to Example I of the practice of the invention, four different lots (four items per lot) of layer cake utilizing a shortening ingredient were prepared, lot II-A used NFDM, lot II-B used regular whey solids, lot II-C used the selected partially demineralized and partially delactosed whey solids, and lot II-D used the blend of the partially demineralized and partially delactosed whey combined with the modified starch. The layer cake constituents comprise the following:

| Ingredients | Approximate Percent by Weight (Preferred) | | | |
|---|---|---|---|---|
| | II-A | II-B | II-C | II-D |
| Flour | 24.5 | 24.5 | 24.5 | 25.5 |
| Sugar | 29.50 | 29.5 | 29.5 | 30.5 |
| Water | 30.25 | 30.25 | 30.25 | 30.25 |
| Whole Egg Solids | 3.00 | 3.00 | 3.00 | 3.00 |
| Shortening | 7.00 | 7.00 | 7.00 | 7.00 |
| Leavening | 1.50 | 1.50 | 1.50 | 1.50 |
| Salt | .75 | .75 | .75 | .75 |
| Emulsifier | .50 | .50 | .50 | .50 |
| NFDM | 3.00 | — | — | — |
| Regular Whey Solids | — | 3.00 | — | — |
| Selected Whey Solids | — | — | 3.00 | .85 |
| Modified Starch | — | — | — | .15 |

PROCEDURE:

The cakes were prepared according to the following procedure:

Combine and blend the dry ingredients, add the shortening and two-thirds of the water while mixing at low (first) speed with the cake paddle on C100 Hobart Mixer. Mix 2½ minutes at high (third) speed, add the remaining water and mix two minutes at low (first) speed on the C100 Hobart Mixer.

Weigh 13 ounces into a greased 8" round layer cake pan. Bake 25 minutes at 375°F.

The procedure was repeated for lot II-C with the selected whey varying from 0.4–3.0 percent by weight. The procedure was repeated for lot II-D with the blend varying for the selected whey from 0.4–3.0 and for the modified starch from 0–1.0 percent by weight. The sugar and flour amounts were adjusted accordingly.

RESULTS:

The cakes were evaluated at 24 hours and five days for volume, quality, and keeping quality. The regular whey cake was poorer in quality and lower in volume than the NFDM cake. The selected whey and selected whey starch blend cakes were judged superior to the NFDM cake in quality and keeping properties. Volume of the selected whey and selected whey starch blend cakes was greater than the NFDM cakes.

EXAMPLE III

As still another applicable example of the practice of the invention, four different lots (18 items per lot) of baking powder biscuits were prepared, lot III-A used NFDM, lot III-B used regular whey solids and lot III-C used the selected partially demineralized and partially delactosed whey and lot III-D used the blend of partially demineralized and partially delactosed whey combined with the modified starch. The baking powder biscuit constituents comprise the following:

| Ingredients | Approximate Percent by Weight (Preferred) | | | |
|---|---|---|---|---|
| | III-A | III-B | III-C | III-D |
| Flour | 45.0 | 45.0 | 46.5 | 47.6 |
| Leavening | 4.0 | 4.0 | 4.0 | 4.0 |
| Salt | 1.0 | 1.0 | 1.0 | 1.0 |
| Shortening | 10.0 | 10.0 | 10.0 | 10.0 |
| Water | 36.0 | 36.0 | 36.0 | 36.0 |
| NFDM | 4.0 | — | — | — |
| Regular Whey Solids | — | 4.0 | — | — |
| Selected Whey Solids | — | — | 2.5 | 1.20 |
| Modified Starch | — | — | — | .20 |

PROCEDURE:

The biscuits were prepared according to the following procedure: Combine and thoroughly blend the dry ingredients, cut in the shortening, add the water and mix 30 seconds at low (first) speed on the C100 Hobart Mixer with a cake paddle.

Drop 50 gram dough pieces onto a cookie sheet. Bake 15 minutes at 425°F.

The procedure was repeated for lot III-C ranging with the selected whey varying from 0.4–3.0 percent by weight. The procedure was repeated for III-D with the blend varying for the selected whey from 0.4–3.0 and for the modified starch from 0–1.0 percent by weight. The flour amounts were adjusted accordingly.

RESULTS:

The biscuits were evaluated at 24 hours for volume and quality. The selected whey and whey blend biscuits and the NFDM biscuits were judged to be equal. The regular whey biscuits were low in volume, and had a dense gummy mouth feel.

EXAMPLE IV

As yet another applicable example of the practice of the invention, four different lots (18 items per lot) of common muffins were prepared, lot IV-A used NFDM, lot IV-B used regular whey solids, lot IV-C used the selected partially demineralized and partially delactosed whey, and lot IV-D used the blend of partially demineralized and partially delactosed whey combined with the modified starch. The muffin constituents comprise the following:

| Ingredients | Approximate Percent by Weight (Preferred) | | | |
|---|---|---|---|---|
| | IV-A | IV-B | IV-C | IV-D |
| Flour | 39.0 | 39.0 | 40.0 | 40.50 |
| Salt | .65 | .65 | .65 | .65 |
| Sugar | 8.50 | 8.50 | 8.50 | 9.00 |
| Leavening | 2.00 | 2.00 | 2.00 | 2.00 |
| Whole Egg Solids | 4.50 | 4.50 | 4.50 | 4.50 |
| Vegetable Oil | 5.00 | 5.00 | 5.00 | 5.00 |
| Water | 37.35 | 37.35 | 37.35 | 37.35 |
| NFDM | 3.00 | — | — | — |
| Regular Whey Solids | — | 3.00 | — | — |
| Selected Whey Solids | — | — | 2.0 | .85 |
| Modified Starch | — | — | — | .15 |

PROCEDURE:

The muffins were prepared according to the following procedure: Combine and blend the dry ingredients, add the oil and water, mix 5 seconds at low (first) speed on a standard household mixer, scrape the bowl, and mix an additional 5 seconds on low speed.

Weigh 50 gram portions into greased cupcake pans and bake 18 minutes at 425°F.

The procedure was repeated for lot IV-C with the selected whey varying from 0.4–3.0 percent by weight. The procedure was repeated for IV-D with the blend varying for the selected whey from 0.4–3.0 and for the modified starch from 0–1.0 percent by weight. The flour amounts were adjusted accordingly.

RESULTS:

All muffins had equal volume. The selected whey and whey blend muffins were at least equal to the NFDM muffins in quality. The regular whey muffins had open coarse grain, were slightly tough and had a slight off flavor.

EXAMPLE V

As another applicable example of the practice of the invention, four different lots (18 items per lot) of sweet milk pancakes were prepared, lot V-A used NFDM, lot V-B used regular whey solids, lot V-C used the selected partially demineralized and partially delactosed whey, and lot V-D used the blend of partially demineralized and partially delactosed whey combined with the modified starch. The pancake constituents comprise the following:

| Ingredients | Approximate Percent by Weight (Preferred) | | | |
|---|---|---|---|---|
| | V-A | V-B | V-C | V-D |
| Flour | 33.0 | 33.0 | 33.50 | 34.35 |
| Leavening | 2.0 | 2.0 | 2.0 | 2.0 |
| Salt | .5 | .5 | .5 | .5 |
| Sugar | 5.25 | 5.25 | 5.75 | 6.60 |
| Whole Egg Solids | 3.75 | 3.75 | 3.75 | 3.75 |
| Shortening (melted) | 5.0 | 5.0 | 5.00 | 5.0 |
| Water | 46.50 | 46.50 | 46.50 | 46.50 |
| NFDM | 4.0 | — | — | — |
| Regular Whey Solids | — | 4.0 | — | — |
| Selected Whey Solids | — | — | 3.00 | 1.10 |
| Modified Starch | — | — | — | .20 |

PROCEDURE:

The pancakes were prepared according to the following procedure: Combine and blend the dry ingredients, add the water and mix 20 seconds at low (first) speed on standard household mixer. Add the melted shortening and mix an additional 20 seconds. Fry at 350°F on a griddle for 90 seconds on the first side and 60 seconds on the second side.

The procedure was repeated for lot V-C with the selected whey varying from 0.4–3.0 percent by weight. The procedure was repeated for lot V-D with the blend varying for the selected whey from 0.4–3.0 and for the modified starch from 0–1.0 percent by weight. The flour amounts were adjusted accordingly.

RESULTS:

The pancakes were evaluated immediately after frying for quality and volume. The NFDM pancakes and the selected whey and whey blend pancakes had equal and significantly greater volume than the regular whey pancakes. The NFDM pancakes and the selected whey and whey blend pancakes were also equal in quality and significantly better than the regular whey pancakes which had a tough rubbery core.

EXAMPLE VI

As still another applicable example of the practice of the invention, four different lots of yeast raised donuts were prepared, lot VI-A used NFDM, lot VI-B used regular whey solids, lot VI-C used the selected partially demineralized and partially delactosed whey, and lot VI-D used the blend of the selected partially demineralized and partially delactosed whey combined with the modified starch. The yeast raised donut constituents comprise the following:

| Ingredients | Approximate Percent by Weight (Preferred) | | | |
|---|---|---|---|---|
| | VI-A | VI-B | VI-C | VI-D |
| Bread Flour | 38.0 | 38.0 | 38.0 | 39.95 |
| Cake Flour | 9.50 | 9.50 | 9.50 | 9.50 |
| Gran Sugar | 7.10 | 7.10 | 7.10 | 7.10 |
| Shortening | 8.30 | 8.30 | 8.30 | 8.3 |
| Emulsifier | .10 | .10 | .10 | .1 |
| Whole Egg Solids | 1.30 | 1.30 | 1.30 | 1.30 |
| Salt | .85 | .85 | .85 | .85 |
| Yeast | 3.00 | 3.00 | 3.00 | 3.00 |
| Water | 29.00 | 29.00 | 29.00 | 29.00 |
| NFDM | 2.85 | — | — | — |
| Regular Whey Solids | — | 2.85 | — | — |
| Selected Whey Solids | — | — | 2.85 | .75 |
| Modified Starch | — | — | — | .15 |

PROCEDURE:

The yeast raised donuts were prepared according to the following procedure: Combine ingredients in bowl and mix one minute at low (first) speed on C100 Hobart Mixer using a dough hook, mix 12 minutes at medium (second) speed on Hobart Mixer. Allow dough to ferment 75 minutes, sheet out and cut, then proof for 40 minutes. Proofed donuts are fried 60 seconds per side in 390°F fat.

The procedure was repeated for lot VI-C with the selected whey varying from 0.4–3.0 percent by weight. The procedure was repeated for lot VI-D with the blend varying for the selected whey from 0.4–3.0 and for the modified starch from 0–1.0 percent by weight. The bread flour amounts were adjusted accordingly.

RESULTS:

Donuts were evaluated at 24 hours after frying. The regular whey donuts had poor gas retention and poor fat sealing properties, thus the donuts were low in volume, had coarse open grain and were very high on fat absorption. The selected whey and whey blend donuts and the NFDM donuts were judged to be equal with typical fat absorption, volume and donut quality.

EXAMPLE VII

As another applicable example of the practice of the invention, four different lots (18 items per lot) of white bread were prepared, lot VII-A used NFDM, lot VII-B used regular whey solids, lot VII-C used the selected partially demineralized and partially delactosed whey, and lot VII-D used the blend of partially demineralized and partially delactosed whey combined with the modified starch. The white bread constituents comprise the following:

| Ingredients | Approximate Percent by Weight (Preferred) | | | |
|---|---|---|---|---|
| | VII-A | VII-B | VII-C | VII-D |
| Sponge: | | | | |
| Flour | 34.7 | 34.7 | 34.7 | 34.7 |
| Yeast | 1.60 | 1.60 | 1.60 | 1.60 |
| Yeast Food | .25 | .25 | .25 | .25 |
| Water | 21.25 | 21.25 | 21.25 | 21.25 |
| Dough: | | | | |
| Flour | 18.7 | 18.7 | 18.7 | 20.04 |
| Salt | 1.20 | 1.20 | 1.2 | 1.20 |
| Sucrose | 2.10 | 2.10 | 2.1 | 2.10 |
| Dextrose | 2.70 | 2.70 | 2.70 | 2.70 |
| Lard | 1.60 | 1.60 | 1.60 | 1.60 |
| Water | 13.9 | 13.9 | 13.9 | 13.9 |
| NFDM | 2.00 | — | — | — |
| Regular Whey Solids | — | 2.00 | — | — |
| Selected Whey Solids | — | — | 2.00 | .56 |
| Modified Starch | — | — | — | .10 |

PROCEDURE:

The white bread was prepared according to the following procedure: Adjustments were made by procedures familiar to those skilled in the art in the amount of flour to compensate for the case where there is a difference between the amounts of NFDM and whey blend(s) added.

The sponge ingredients are combined and mixed in a jacketed three pin bowl and mixed for 30 seconds at low (first) speed on C100 Hobart Mixer and four minutes at medium (second) speed on the mixer. The sponge is allowed to ferment for four hours then combined with the dough ingredients and mixed 30 seconds at low (first) speed on C100 Hobart Mixer and eight minutes at medium (second) speed on the mixer. The mixed dough is allowed to relax for 10 minutes then weighed (16 oz.) and shaped into individual loaves. The dough pieces are placed in bread pans and allowed to proof for one hour. The proofed loaves are baked for 21 minutes at 415°F.

The procedure was repeated for lot VII-C with the selected whey varying from 0.4–3.0 percent by weight. The procedure was repeated for lot VII-D with the blend varying for the selected whey from 0.4–3.0 and for the modified starch from 0–1.0 percent by weight. The dough flour was adjusted accordingly.

RESULTS:

The regular whey solids had a slackening effect on the dough consistency and adversely affected the crumb color, grain and texture of the bread as compared to the NFDM. The selected whey and whey blend produced bread equal in quality and with slightly greater specific volume than that of bread made with NFDM.

The foregoing examples and evaluation confirm our discovery that a selected partially demineralized and partially delactosed whey with or without an added modified starch is a suitable replacement for NFDM. These free the product of bakery type goods and the like from the dependency on NFDM as an ingredient with all the attendant advantages of reduced cost at an equivalent or better quality of product. Although the examples have been directed to bakery type goods and the like, it is anticipated that the selected whey and whey blend will function as a NFDM replacement in non-baked products such as custards, puddings, and the like, with equally good product performance.

While we have described above the principles of our invention in connection with specific apparatus, it is to be clearly understood that this description is made only by way of example and not as a limitation to the scope of our invention as set forth in the objects thereof and in the accompanying claims.

We claim:
1. A method of preparing a food composition normally containing nonfat dry milk selected from the group consisting of cakes, biscuits, muffins, pancakes, donuts, and breads comprising replacing substantially all the nonfat dry milk requirement of said food composition with partially demineralized and partially delactosed whey solids in an amount to form 0.4 to 3.0 percent by weight of the composition and wherein said whey solids has an ash to protein ratio of 0.01 to 0.3.

2. The method of claim 1 including adding up to 1 percent by weight to the composition of a modified starch.

3. A food composition normally containing nonfat dry milk selected from the group consisting of cakes, biscuits, muffins, pancakes, donuts, and breads comprising replacing said normal nonfat dry milk requirement of food composition with partially demineralized and partially delactosed whey solids to form 0.4 to 3.0 percent by weight of the composition and wherein said whey solids has an ash to protein ratio of 0.01 to 0.3.

4. The food composition of claim 3 including a modified starch in an amount not to exceed about 1.0 percent by weight of the composition.

* * * * *